Dec. 27, 1949   C. G. LUTTS   2,492,164
ELASTIC PROVING BAR
Filed July 25, 1946
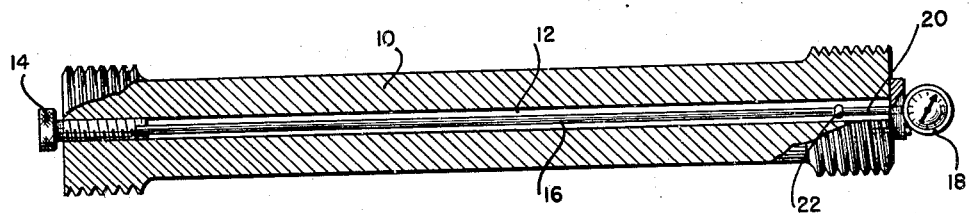
INVENTOR
CARLTON G. LUTTS
BY
ATTORNEY Patented Dec. 27, 1949

2,492,164

UNITED STATES PATENT OFFICE 2,492,164

ELASTIC PROVING BAR

Carlton G. Lutts, Salem, Mass.

Application July 25, 1946, Serial No. 686,101

3 Claims. (Cl. 73—88)

(Granted under the act of March 3, 1883, as amended April 30, 1928; 370 O. G. 757)

This invention relates in general to elastic proving bars and more specifically to an improvement in such bars providing more accurate measuring means.

Proving bars have been in use for many years for verifying testing machines. A typical proving bar consists of a solid cylindrical bar of metal with means at each end for holding the bar in a testing machine. The proving bar is used as a standard and its elongation or compression under various loads is measured as a function of said load. The proving bar is first calibrated against a standard and is then used for verification of any testing machine, as long as its elastic limit is not exceeded.

Changes in length of such bars are measured around the surface of the bar usually at four equally spaced points around its circumference. Appreciable variations are often experienced in the readings obtained at the four positions. Presumably, slight unavoidable eccentricities in loading cause these variations. The average of the readings obtained is taken and used as a result. This adds more calculations to the problem and may cause inaccuracies.

It is thus an object of this invention to provide an improved elastic proving bar.

Another object of this invention is to provide an improved elastic proving bar which provides single means for directly measuring changes in length.

These and other objects will be apparent from the following specification when taken with the accompanying drawing which shows a cross-sectional view illustrating a form of the invention.

The invention will now be described with reference to the drawing. A cylindrical bar 10 threaded at both ends is made of a desired length and cross-sectional area to withstand the loads under which it is to be operated. A small diameter hole 12 is drilled axially through the bar 10. One end of hole 12 is tapped to take a set screw 14. A small rod 16 is fastened to the end of set screw 14 and extends through hole 12 almost to the other end of proving bar 10. A dial indicator 18 is fastened to the end of bar 10 opposite set screw 14. A short spindle 20 extends into hole 12 from dial indicator 18. Set screw 14 is adjusted to make contact between rod 16 and spindle 20 at point 22 when there is no load on proving bar 10.

In operation, the center rod 16 remains unchanged in length while proving bar 10 changes in length under load. Thus the dial indicator 18 moves with the proving bar 10. A tension spring and gear mechanism in dial indicator 18 causes spindle 20 to move and maintain contact at point 22 with the rod 16. Changes in length of proving bar 10 are thus indicated directly by dial indicator 18. The changes in length thus measured at the axial center of proving bar 10 are the average changes in length of said proving bar. Suitable dial indicators may be used to obtain sufficient deflection for given load increments on proving bar 10 to obtain a desired sensitivity.

The bar 10 is placed in a standardized test machine and the change in length is plotted against change in load to obtain a calibration curve for the proving bar 10. A particular bar tested was found to have a very satisfactory straight line relationship between load and changes in length. Calibration points were reproduced easily in successive runs, and as long as the elastic limit of bar 10 is not exceeded it may be used as a standard. Proving bar 10 after calibration may be used as a standard in any testing machine to verify the calibration of the testing machine by determining the change in length of proving bar 10. Further application of the proving bar can be found in measuring pulling stresses in chains and cables by inserting the bar in series with the chain being tested, and reading directly the elongation of the bar, whereby the load being applied can be determined very accurately from the calibration curve for the bar.

Thus this improved elastic proving bar provides a means of determining changes in length directly along the central axis of the proving bar. It eliminates the need of taking several measurements along the outer surface of the bar. It provides an accurate reading automatically which is the average of all the elastic movements involved.

It is believed that the construction and operation as well as the advantages of this improved elastic proving bar will be apparent from the foregoing detailed description thereof. It will be apparent that numerous suitable materials are available for construction of this bar. A satisfactory bar was machined from 4½ inch diameter rolled alloy steel bar of high elastic quality, S. A. E. 4340. The heat treatment consisted of quenching in oil from 1575 degrees Fahr. followed by drawing to 1200 degrees Fahr. This was conducted before machining in order to obtain a maximum degree of straightness and to avoid warpage sometimes accompanying heat treatment. It will also be apparent that while the invention has been shown and described in a preferred form changes may be made in the apparatus disclosed without departing from the spirit of the invention as sought to be defined in the appended claims.

The invention described herein may be manufactured and used by or for the Government of the United States of America for Government purposes without the payment of any royalty thereon or therefor.

What is claimed is:

1. Apparatus for verifying strain testing machines comprising, an elongated proving bar having threaded portions at the ends thereof for engagement with said testing machine, a stationary unstressed rod extending along an axial central opening within said proving bar, means for securing a first end of said rod to one end of said proving bar, and an indicator rigidly attached to the other end of said proving bar, said indicator having a movable spindle extending coaxially within said bar to contact the free end of said rod, said indicator thereby being operative to indicate movement between the free end of said rod and said other end of said proving bar when an axial load is applied to said proving bar by said machine.

2. Standard elastic proving apparatus for verifying the calibration of materials testing machines, said apparatus comprising, an elongated elastic proving bar having a threaded portion at each end for engagement in said testing machine whereby an axial load may be applied to said bar, a slender rod secured to one end of said bar and extending freely within and coaxially with said bar toward the other end of said bar, a spring loaded indicator having a movable spindle, said indicator being secured to said other end of said bar with said spindle extending within and coaxially with said bar to contact the free end of said rod, said indicator thereby being operative to indicate movement between the free end of said rod and said other end of said bar, and means for axially adjusting said rod to insure contact with said spindle.

3. Standard elastic proving apparatus for verifying the calibration of materials testing machines, said apparatus comprising, an elastic bar having a threaded portion at each end for engagement in said testing machine whereby an axial load may be applied to said bar, a rod secured to one end of said bar and extending freely within and coaxially with said bar toward the other end of said bar, an indicator having a movable spindle, said indicator being secured to said other end of said bar with said spindle extending within and coaxially with said bar to contact the free end of said rod, said indicator thereby being operative to indicate movement between the free end of said rod and said other end of said bar.

CARLTON G. LUTTS.

REFERENCES CITED

The following references are of record in the file of this patent:

UNITED STATES PATENTS

| Number | Name | Date |
|---|---|---|
| 1,623,238 | Frost et al. | Apr. 5, 1927 |
| 1,650,789 | Doolittle | Nov. 29, 1927 |
| 2,061,261 | Walter | Nov. 17, 1936 |

FOREIGN PATENTS

| Number | Country | Date |
|---|---|---|
| 22,184 | Great Britain | A. D. 1911 |
| 397,701 | Great Britain | Aug. 31, 1933 |
| 624,801 | Germany | Jan. 29, 1936 |
| 698,710 | Germany | Nov. 15, 1940 |
| 711,740 | France | July 8, 1931 |